Dec. 7, 1965

MASAHIKO FUKETA 3,221,626

MECHANISM FOR OPERATING THE REFLECTING MIRROR OF SINGLE LENS REFLEX CAMERAS

Filed July 30, 1963

INVENTOR.
MASAHIKO FUKETA
BY
ATTORNEY

United States Patent Office 3,221,626
Patented Dec. 7, 1965

3,221,626
MECHANISM FOR OPERATING THE REFLECTING MIRROR OF SINGLE LENS REFLEX CAMERAS
Masahiko Fuketa, 609 Arai-cho, Nakano-ku, Tokyo, Japan
Filed July 30, 1963, Ser. No. 298,654
Claims priority, application Japan, Dec. 11, 1959, 34/63,850
3 Claims. (Cl. 95—42)

This application is a continuation-in-part of my application Serial No. 47,801, filed August 5, 1960, and now abandoned.

This invention relates to a mechanism for operating the reflecting mirror of single lens reflex cameras, and more particularly to an improved mechanism which swings the reflecting mirror upwardly to the position it occupies out of the photographic light beam while taking a picture and automatically and quickly restores the mirror to its normal view finding position in such beam by means of a single spring energized by the manual operation of the shutter-cocking and film-winding means of the camera.

An object of this invention is to provide a simple, yet positive, operating mechanism for quickly restoring the reflecting mirror of a single lens reflex camera to its normal position in which it is diagonally disposed in and across the light beam through the camera objective between the objective lens and the shutter assembly. In the diagonal position of the mirror, the image received through the photographic main lens is reflected by the mirror into the view finder, the mirror being automatically and quickly swung upwardly to the picture taking position by a single spring energized by the manual operation of the shutter and film winding knob of the camera and the subsequent simultaneous operation thereof on manual depression of the shutter release button to take a picture, the mirror, on completion of the exposure, being quickly and automatically returned to its normal view finding position by the residual energy stored in the aforementioned spring.

It will be understood that the foregoing general description, as also the following detailed description, are illustrative and explanatory of the invention and in no way restrictive thereof. The accompanying drawing illustrates one embodiment thereof as incorporated in a focal plane shutter single lens reflex camera, and together with the description which follows, serves to explain the principle thereof. In such drawing.

Figure 1:
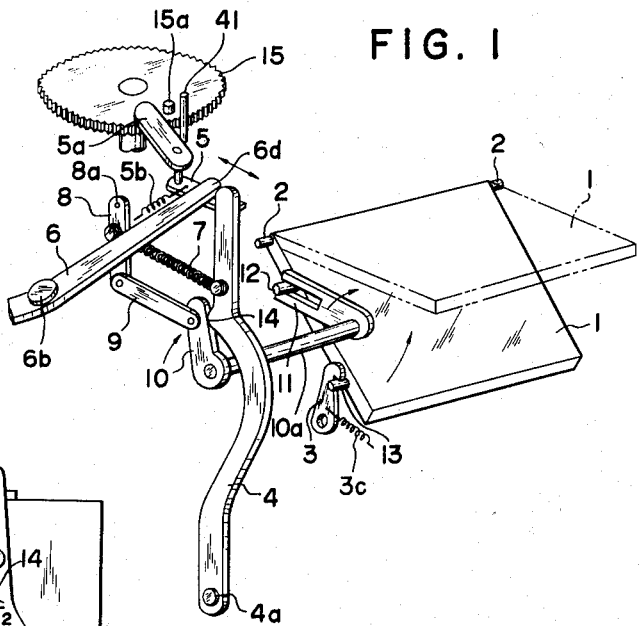
FIG. 1 is a perspective view of my invention with the reflecting mirror in its picture viewing position, the picture taking position being indicated in dashed lines.

Directing our attention first to the mirror operating mechanism per se, reflecting mirror 1 is mounted on rotatable horizontal shaft 2 and is aligned with, and centralized relative to, the camera exposure aperture and curtain shutter opening and is latchable in its normal diagonal position intercepting the light beam defined by the photographic objective and diaphragms by a spring biased claw 3. One end of the claw biasing spring 3c is anchored in the camera body and the other end thereof in the claw in such manner that when the camera exposure button 16 and rod 16a restore upwardly after taking a picture, such claw biasing spring rotates the horizontal shaft 3a on which the claw is mounted in the direction to reengage claw 3 to mirror pin 13 described below. An elongated vertical lever 4 is pivoted on a fixed stub-shaft 4a at its lower end region, while at its upper end region a spring biased stop 5 is rotatable at predetermined times into the path of movement of such upper end of lever 4 to prevent further movement of lever 4 in its return direction, as described below. Another spring biased lever 6 is deflectable, under the control of the rotation of the film winding knob 22 of the camera, at right angles as seen from two-headed directional arrow (in FIGS. 1 and 5) to and from the upper free end region of lever 4. Lever 6 is pivoted to the camera body for deflection in a horizontal plane below the upper end of lever 4 and above lever 5 on pivot 6b in the camera body. The outer surface of one end 6a of lever 6 is, prior to the film winding operation by rotating film and shutter winding knob 22 in the direction of the arrow on knob 22, that is, at the position shown in FIG. 5, just adjacent to inner surface of protruding part 17c of cam 17 by means of a spring 6c, one end of which is fixed to lever 6 and the other end is to camera body. Spring 6c functioning to bias lever 6 in counterclockwise direction with its end 6a against the peripheral surface of cam 17. Tension operating spring 7 is anchored at one end in the upper end region of elongated lever 4 and at its other end in short arm 8 pivoted at its upper end at fixed pivot 8a, the lower end of arm 8 being pivoted to one end of link 9, the other end of link 9 being pivotally connected to the free end of radial arm 10 at one end of rotatable horizontal shaft 10a. The other end of shaft 10a the nearer to mirror 1 integrally supports a second radial arm 11 which is forked at its free end, a pin 12 extending from the adjacent lateral mirror edge at a point nearer to the mirror supporting shaft 2 than a second pin 13, also so extending from such mirror edge, adapted to be engaged by latching claw 3. Tension lever 4 has a protrusion 14 at a region somewhat below that at which spring 7 is anchored to lever 4 facing, and substantially aligned with, and, on freedom of lever 4 to move under the tension of spring 7, adapted to engage arm 10 at the region where link 9 is pivoted thereto.

Cam 17 is mounted on the shaft of gear 19, which is coupled to gear 21 mounted on the shaft of film and shutter winding knob 22 through gears 20 and 20', while gear 15 attached to the upper end of shaft 31 of shutter drum 15' is coupled to gear 19 by means of a train of gears 25, 25' and 26, gear 26 being attached to the upper end of shaft 27, which at a lower portion thereof is provided with a flange 29 on which rests arm 30 projecting from the lateral face of arm 3b, against the free end of which vertical push button rod 16a abuts. The lower end of shaft 27 rests on the free and upper end of bent spring plate 28, of which the fixed and lower end is attached to the camera body by pin 28a. At the lower end of shaft 31 of shutter drum 15' is provided cam 32 having a notch 33 engageable with hook end 34A of horizontally elongated lever 34. Lever 34 is rotatable about pin 35 fixed to the camera body and normally being biased in clockwise direction by a spring 36, one end of which is attached to lever 34 to the left of pin 35 and its other end is affixed to the camera body. The right end of lever 34 is forked within which is engaged a pin 38 projecting from the horizontal portion 37' of vertical plate 37, the latter being rotatable about a central pin 39 fixed to camera body. A recess 37a is provided at the upper region of plate 37 and at essentially the same plane as that in which rotatable horizontal mirror shaft 2 is positioned and to this recess 37a is engageable a short rod 1a longitudinally affixed to the central portion of front edge of mirror 1. Shutter 23 is adapted to be wound about shutter drum 15′ when film is wound up and to be drawn in the opposite direction to the other conventional drum 40 when an exposure is made, by the torsional spring provided in such conventional drum 40.

Figure 2:
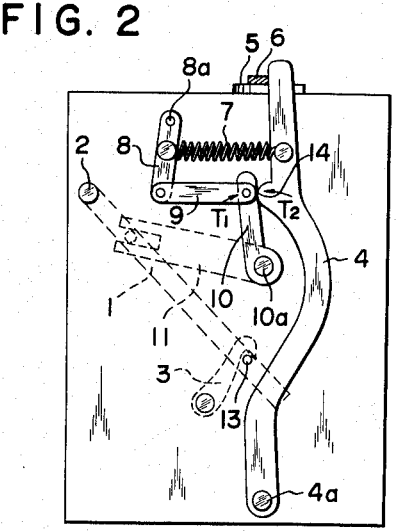
FIG. 2 is a side view when the mechanism is not yet tensioned.
Figure 3:
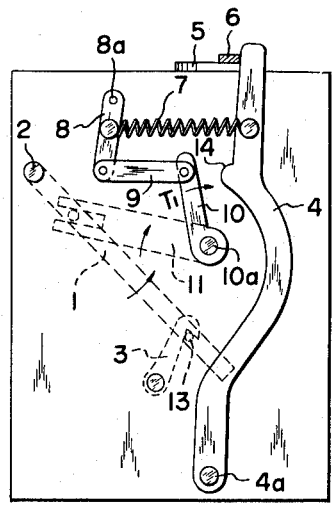
FIG. 3 is a side view thereof with the mechanism fully tensioned.
Figure 5:
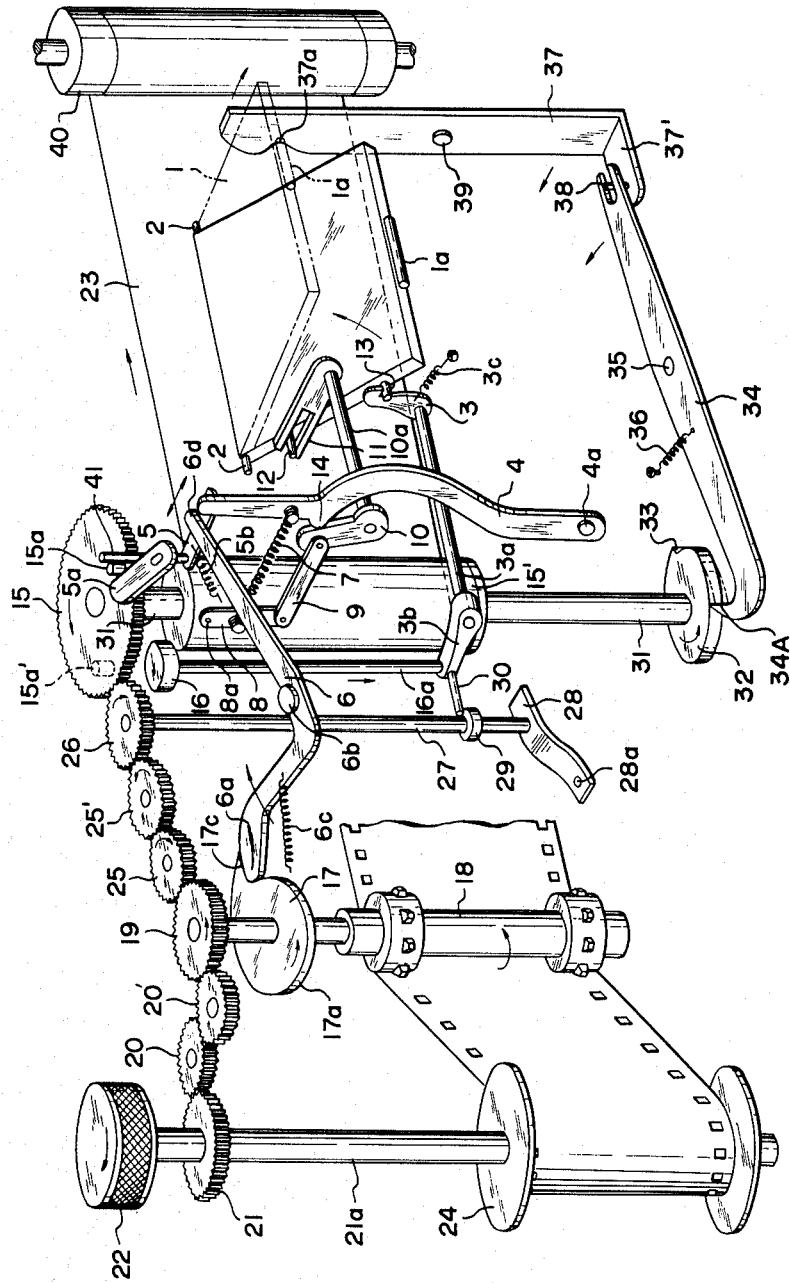
FIG. 5 is a schematic simplified diagram showing the interconnection of the inventive mirror operating mechanism with the shutter and film mechanism of a single lens reflex camera of the curtain shutter type.

In its normal untensioned, that is, maximum contracted condition, spring 7 and the system of levers and arms of the mirror operating mechanism are as shown in FIG. 2. FIG. 5 shows more in detail the condition shown in FIG. 2, and in this state the film is not yet wound up. On continued rotation of film and shutter winding knob 22 in the direction of the arrow on knob 22, cam 17 being on the shaft of gear 19 of the first train of gears 21, 20, 20′ and 19 coupling the film sprocket 18 and the film take-up reel 24, the free end 6a of lever 6 is pushed by the increasing inclination of cam surface 17a of cam 17 in the direction of the arrow shown in FIG. 5 above spring 6c or clockwise, moving lever 4 outwardly to tension spring 7 while simultaneously and toward the end of such tensioning, stop member 5, under the tension of its own biasing spring 5b is pulled to the left in FIG. 5 into the portion of the path vacated by such movement of the upper end of lever 4 (FIG. 3). This is possible because gear 15, coupled to winding knob 22 through the train of gears as aforementioned, is at this time rotating in the direction of the arrow on gear 15 so that pin 15a on gear 15 disengages arm 5. As clearly seen in FIG. 5, arm 5a is integral with the upper end of the shaft from the lower end of which stop arm 5 extends in the substantially diametrically opposite direction; the shaft of arms 5 and 5a being rotatably supported vertically in an aperture through the camera body adjacent to gear 15; pin 41 projecting from the camera body adjacent to the periphery of gear 15 has as its function to stop arm 5a at the predetermined position at which pin 15a disengages arm 5a, at which time arm 5a moves clockwise by means of spring 5b; when pin 15a disengages arm 5a, stop arm 5 contacts with the right side of lever 4 by spring 5b, and on the continued rotation of gear 15 while winding the film for one frame pin 15a reaches position 15a′, shown dotted, while cam 17 rotates through one revolution, and when the remote end portion, 6d of lever 6 pushes lever 4 to its maximum clockwise rotation by the aid of the maximum radius of cam surface 17a, lever 4 disengages the right side surface of stop arm 5 so that spring 5b biases the free end of arm 5 in the path of movement of lever 4. At this time pin 41 engages the right side surface of arm 5a to prevent the arm 5 from further rotating beyond the path of movement of lever 4, and thereby the movement of lever 4 in its return direction is prevented when cam 17 and one end 6a of lever 6 restore to their respective positions shown in FIG. 5 after a single winding of knob 22 advancing one frame of the film.

While winding up the film, shutter drum 15′ is rotated counterclockwise to draw the shutter 23 in the direction opposite to that of the arrow (near reference numeral 23 in FIG. 5), and at the same time cam 32 is rotated counterclockwise until notch 33 engages with the hook end 34A of elongated lever 34 as shown in FIG. 5 (notch 33 shown dotted).

Figure 4:
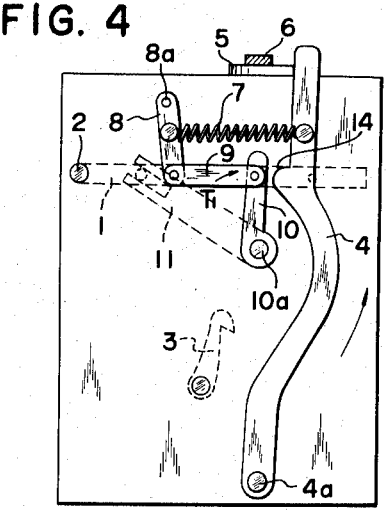
FIG. 4 is such a side view with the mirror rotated upwardly by the mechanism during an exposure.

With stop arm 5 in the path of the upper end of lever 4, tension spring 7 can move only arm 8, thus moving link 9 to the right (FIGS. 4 and 5) and thereby rotating arm 10, shaft 10a and forked arm 11 clockwise so that mirror 1 is moved upwardly to its horizontal position when claw 3 disengages pin 13 as push button rod 16a depresses arm 3b; the mirror occupying such horizontal position only for the time required to make one exposure. Also, while claw 3 releases pin 13, arm 30 projecting from arm 3b depresses flange 29 whereby gear 26 moves down to interrupt the coupling between gear 15 and the film winding knob 22. Short rod 1a of mirror 1, when the mirror 1 is moved upwardly, pushes the portion below recess 37a and above pivot 39 of vertical plate 37 to rotate this plate clockwise which in turn moves lever 34 counterclockwise to disengage notch 33 from hook portion of lever 34, thereby shutter 23 is quickly drawn in the direction of the arrow to drum 40 for making one exposure, by means of the torsional spring (not shown) provided in the drum.

When the exposure has been made and during the last stage of the movement of the shutter 23 to the right, pin 15a rotated clockwise with gear 15, kicks arm 5a to rotate stop arm 5 to the right to disengage it from lever 4 and at the same time the outside surface of notch 33 of disc 32 pushes the hook end 34A of lever 34 outwardly to rotate lever 34 counterclockwise about pin 35 thereby rotating plate 37 clockwise about pin 39, thereby rotating mirror 1 its diagonal position by the aid of spring 7 which pulls lever 4 counterclockwise (FIG. 4), protrusion 14 being pressed with a force $T_2$ against arm 10, rotating shaft 10a counterclockwise and restoring mirror 1 to its viewfinding position. Arm 10, while simultaneously receiving a force $T_1$ from lever 8, which now is also free to move under the tension of spring 7, and link 9. Force $T_1$ tends to rotate arm 10 clockwise but is obviously of a lesser magnitude than $T_2$, the latter being the tension of spring 7 at the leverage of the length of lever 4 while the former is such tension of spring 7 diminished by the leverage of lever 8. To ensure the condition $T_2 > T_1$, the ratio of the length from pin 4a to the point of lever 4 where one end of spring 7 is anchored to that from pin 4a to protrusion 14, is made larger than the ratio of the length from pin 8a to the point of lever 8 where the other end of spring 7 is anchored to that from pin 8a to the point at which lever 8 is coupled to link 9. When the manual pressure on push button rod 16a is released, the free end of spring plate 28 moves upward to push the end of shaft 27 upwardly, thereby both push button rod 16a and gear 26 restore their respective positions shown in FIG. 5, arm 3b and horizontal shaft 3a rotate clockwise by the aid also of biasing spring 3c to reengage claw 3 to mirror pin 13. Thus, all parts of the mechanism restore to their preoperated condition shown in FIG. 5 before winding knob 22 is again manually rotated for the next exposure.

The present new mechanism of the simple structure as described above, enables making one and the same spring positively operate the two different functions of swinging up to make an exposure and of restoring the mirror to its intercepting, normal, view-finding position.

What I claim is:

1. In an operating mechanism for the reflex mirror within the body of a photographic camera having a shutter, a shutter and film winding means, and shutter release means, the combination of a lever system including a first lever pivoted at one end to the camera body, an intermediate link pivotally connected to the other end of the first lever and an arm pivotally connected to the other end of the link, a rotatable shaft, the arm being affixed to the shaft, means interconnecting the shaft and the reflex mirror, a tension lever pivoted to the camera body at a region spaced from the pivot of the first lever, a spring of which one end is anchored to an intermediate region of the first lever and its other end to the free end region of the tension lever, a projection at an intermediate region of the tension lever facing and substantially aligned with the pivotal interconnection between the intermediate link and the arm, a priming lever interconnected with the shutter winding mechanism and having its free end region against the free end region of the tension lever, a movable stop connected to the shutter winding mechanism, the priming lever on winding up the winding mechanism preparatory to making an exposure deflecting the tension lever to tension the spring and on maximum deflection of the tension lever in the spring tensioning direction to stop member moving into the return path of the tension lever to prevent return movement of the tension lever to its original position, the projection and the pivotal link-to-arm interconnection being spaced from each other when the spring is fully tensioned, a spring biased latching pawl pivoted to the camera body, means on the mirror engageable by the pawl and normally engaged therewith to hold the mirror in the light intercepting position, and means interconnecting the pawl and the shutter release means to disengage the pawl from the engageable means on the mirror on an exposure actuation of the shutter release means permitting immediate rotation of the mirror on such release to its withdrawn position, while on removal of the movable stop member from the return path of the tension lever the tension of the spring causes the projection to strike and engage the pivotal interconnection to rotate the mirror to its intercepting position.

2. The combination according to claim 1 in which the lever system and the tension lever are disposed vertically, the first lever is of relatively short length as compared to the tension lever, the tension lever is pivoted at its lower end while the first lever is pivoted at its upper end, and the spring is so anchored at its respective ends that its longitudinal axis is substantially horizontal.

3. The combination according to claim 1 in which the means interconnecting the shaft and the mirror includes an additional arm affixed to the shaft and having its free end forked, and a pin extending laterally from the mirror and so positioned as to extend through the slot of the forked arm at the outer end of the slot, the forked arm being angularly disposed to the arm pivotally interconnected to the link so that when the forked arm is vertical the mirror is in its withdrawn position.

No references cited.

JOHN M. HORAN, *Primary Examiner.*